US011628561B2

(12) United States Patent
Kim et al.

(10) Patent No.: US 11,628,561 B2
(45) Date of Patent: Apr. 18, 2023

(54) SYSTEM AND METHODS FOR ROBOTIC PRECISION PLACEMENT AND INSERTION

(71) Applicant: The Hong Kong University of Science and Technology, Hong Kong (CN)

(72) Inventors: Chung Hee Kim, Hong Kong (CN); Jungwon Seo, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 386 days.

(21) Appl. No.: 16/871,884

(22) Filed: May 11, 2020

(65) Prior Publication Data

US 2021/0053215 A1 Feb. 25, 2021

Related U.S. Application Data

(60) Provisional application No. 62/922,556, filed on Aug. 19, 2019.

(51) Int. Cl.
*B25J 9/16* (2006.01)
*B25J 9/10* (2006.01)
(Continued)

(52) U.S. Cl.
CPC ............ *B25J 9/1612* (2013.01); *B25J 9/102* (2013.01); *B25J 9/106* (2013.01); *B25J 9/1687* (2013.01);
(Continued)

(58) Field of Classification Search
CPC ...... B25J 15/0004; B25J 15/10; B25J 15/103; B25J 9/1612; B25J 9/102; B25J 9/106; B25J 9/1065; B25J 9/1687
(Continued)

(56) References Cited

U.S. PATENT DOCUMENTS 4,098,001 A 7/1978 Watson
4,273,506 A 6/1981 Thomson et al.
(Continued)

OTHER PUBLICATIONS

Yamanobe, Natsuki, et al., "Analysis of Assembly Skills for Dry Battery Insertion based on Force Control Parameters", *Proceeding of the 2008 IEEE International Conference on Robotics and Biomimetics*, Bangkok, Thailand, pp. 191-197, (Feb. 21-26, 2009).
(Continued)

*Primary Examiner* — Dean J Kramer
(74) *Attorney, Agent, or Firm* — Leydig, Voit & Mayer, Ltd.

(57) ABSTRACT

A system and methods are disclosed for precision placement or insertion of an object using robotic manipulation. A robotic tool includes at least three members, including a first member and a second member that grip the object between opposing faces and a third member that exerts a force on a proximate end of the object to push the object out of the robotic tool. A series of maneuvers is performed with the robotic tool in order to place the object on a surface or insert the object in a hole. The maneuvers include positioning the object against the surface, rotating the object around a contact point between the object and the surface, rotating the robotic tool around a contact point between the object and either the first or second member of the robotic tool, sliding the object horizontally along a surface, and tucking the object into a final desired position.

18 Claims, 17 Drawing Sheets

(51) Int. Cl.
*B25J 15/00* (2006.01)
*B25J 15/10* (2006.01)

(52) U.S. Cl.
CPC ....... *B25J 15/0004* (2013.01); *B25J 15/0028* (2013.01); *B25J 15/10* (2013.01)

(58) Field of Classification Search
USPC ........................................................ 700/253
See application file for complete search history.

(56) References Cited

U.S. PATENT DOCUMENTS

| | | | |
|---|---|---|---|
| 4,286,380 A * | 9/1981 | Blount | H05K 13/041 |
| | | | 901/38 |
| 4,479,673 A | 10/1984 | Inaba et al. | |
| 5,161,847 A * | 11/1992 | Yakou | B25J 15/103 |
| | | | 901/46 |
| 7,370,896 B2 | 5/2008 | Anderson et al. | |
| 8,408,619 B2 * | 4/2013 | Murakami | B25J 15/10 |
| | | | 294/213 |
| 8,794,685 B2 | 8/2014 | Murakami et al. | |
| 8,935,004 B2 | 1/2015 | Iida | |
| 9,399,295 B2 * | 7/2016 | Roberts | B64G 1/1078 |
| 9,808,936 B2 * | 11/2017 | Chavan Dafle | B25J 15/0004 |
| 10,071,483 B2 * | 9/2018 | Shimodaira | B25J 17/0208 |
| 11,298,818 B2 * | 4/2022 | Kawabata | B25J 9/1612 |
| 2012/0253516 A1 | 10/2012 | Iida | |
| 2016/0052135 A1 * | 2/2016 | Motoyoshi | B25J 9/1633 |
| | | | 29/281.6 |
| 2020/0147814 A1 * | 5/2020 | Hirahara | G06Q 10/08 |

OTHER PUBLICATIONS

Dafle, Nikhil Chavan, et al., "Extrinsic Dexterity: In-Hand Manipulation with External Forces", *2014 IEEE International Conference on Robotics& Automation (ICRA)*, Hong Kong Convention and Exhibition Center, Hong Kong, China, pp. 1578-1585, (Jun. 7, 2014).

Almeida, Diogo, et al., "Folding Assembly by Means of Dual-Arm Robotic Manipulation", *2016 IEEE International Conference on Robotics and Automation (ICRA)*, Stockholm, Sweden, pp. 3987-3993, (May 16-21, 2016).

Kim, Chung Hee, et al. "Shallow-Depth Insertion: Peg in Shallow Hole Through Robotic In-Hand Manipulation", *IEEE Robotics and Automation Letters*, vol. 4, No. 2, pp. 383-390, (Apr. 2019).

* cited by examiner

SYSTEM AND METHODS FOR ROBOTIC PRECISION PLACEMENT AND INSERTION

CROSS-REFERENCE TO RELATED APPLICATIONS

This application claims priority to U.S. Provisional Application No. 62/922,556, filed on Aug. 19, 2019, which is hereby incorporated by reference in its entirety.

TECHNICAL FIELD

The application relates to robotics. More specifically, the application is directed to robotic manipulation of objects for precision placement or insertion.

BACKGROUND

Robotic technologies are used in a wide variety of applications including assembly of commercial objects, both large (such as automobile chassis) and small (such as mobile phones). Some applications, for example, the task of robotic welding, may not require advanced dexterity, such as the capability of reconfiguring an object relative to a gripper disposed on the end of the robotic arm. However, other tasks such as inserting a battery in a mobile phone may require dexterous and coordinated motions that are difficult to perform with common grippers.

Although a large number of techniques and tools have been developed for robotic applications, handling objects with a thin-form factor still remains a challenge for which conventional tools and/or techniques are unsuitable.

SUMMARY

A system and methods are disclosed for precision placement and/or insertion of an object using robotic manipulation. The object can be placed on a flat surface or inserted into a shallow hole against a flat surface at the bottom of the hole. A robotic tool includes at least three members, including a first member and a second member that grip the object between opposing faces and a third member that exerts a force on a proximate end of the object to push the object out of the robotic tool. A series of dexterous maneuvers is performed with the robotic tool in order to dispose the object at a desired position (e.g., configuration).

In accordance with one aspect of the present disclosure, a controller is disclosed, the controller is configured to operate a robotic tool to perform precision placement or insertion. The controller includes a memory storing instructions for operating the robotic tool and a processor configured to execute the instructions to cause the robotic tool to perform a series of maneuvers. The series of maneuvers include gripping the object between a first member and a second member of the robotic tool, positioning the object at a desired position, rotating the robotic tool around a first contact point between the distal end of the object and a surface, adjusting the first member and the second member of the robotic tool while rotating the robotic tool around a second contact point between the object and one of the first member or the second member, and performing a push-tuck maneuver by extending a third member to eject the object from the robotic tool. In the desired position after initially positioning the object, a distal end of the object contacts the surface.

In some embodiments, the series of maneuvers further includes, after the adjusting while rotating, repositioning the object horizontally along the surface. In an embodiment, the series of maneuvers further includes repeating, one or more times, the rotating, adjusting while rotating, and repositioning to bring the configuration of the object closer to a penultimate target configuration prior to performing the push-tuck maneuver.

In some embodiments, the third member extends out of a hole in a base of the robotic tool. In other embodiments, the third member is attached to a base of the robotic tool via one or more links connected to the third member and the base via joints. In an embodiment, the first member and the second member are each connected to a base of the robotic tool via a 4-bar linkage assembly.

In some embodiments, the third member is included in an attachment for a parallel-j aw gripper, and wherein the combination of the attachment with the parallel-jaw gripper comprises the robotic tool.

In some embodiments, the processor receives feedback from an input/output (I/O) interface connected to one or more sensors, and wherein the feedback is utilized to position the object.

In some embodiments, the object is a thin form-factor object. In an embodiment, a width of the object can be less than half the length of the object. In another embodiment, the width of the object is less than one-tenth of the length of the object.

In some embodiments, the series of maneuvers further includes repositioning the object relative to the first member and the second member, utilizing the third member, prior to positioning the object at the desired position.

In another aspect of the present disclosure, a method is disclosed for placing or inserting an object. The method includes the steps of: gripping the object in a robotic tool, positioning the object at a desired position, rotating the robotic tool around a contact point between the distal end of the object and a surface, adjusting the first member and the second member of the robotic tool while rotating the robotic tool around a contact point between the object and one of the first member or the second member, and performing a push-tuck maneuver by extending a third member to eject the object from the robotic tool. The robotic tool includes a first member that exerts a force against a first face of the object and a second member that exerts an opposite force against an opposing face of the object. A distance between the first face and the opposing face accommodates a width of the object. In the desired position after initially positioning the object, a distal end of the object contacts the surface.

In some embodiments, the rotating, adjusting, and repositioning are performed repeatedly two or more times until the object is close to a penultimate target configuration.

In some embodiments, the object is secured between at least three contact points during all maneuvers of the robotic tool. The at least three contact points include a first contact point between the object and the surface, a second contact point between the object and the distal end of the third member, and a third contact point between the object and at least one of the first member or second member.

In some embodiments, the steps further include, after the adjusting while rotating, repositioning the object horizontally along the surface.

In some embodiments, the third member is attached to a base of the robotic tool via one or more links connected to the third member and the base via joints. In other embodiments, the third member is included in an attachment for a parallel jaw gripper. The combination of the attachment with the parallel jaw gripper comprises the robotic tool.

In some embodiments, the steps further include repositioning the object relative to the first member and the second member, utilizing the third member, prior to positioning the object at the desired position.

In yet another aspect of the present disclosure, an attachment for a parallel-jaw gripper is disclosed. The parallel jaw gripper includes a first member and a second member configured to grip an object between a first face of the first member and an opposing face of the second member. The attachment includes a base and a third member connected to the base via one or more linkage assemblies. The linkage assemblies are configured to cause the third member to be disposed between the first member and the second member of the parallel jaw gripper and move in a direction along a primary axis of the parallel-jaw gripper to exert a force on a proximate end of the object.

In some embodiments, the one or more linkage assemblies include: a first linkage assembly that includes a pair of linkages connected via a joint, and a second linkage assembly that includes a second pair of linkages connected via a second joint. A first linkage in the pair of linkages of the first linkage assembly is connected to the base and a second linkage in the pair of linkages of the first linkage assembly is connected to the third member. A first linkage in the second pair of linkages is connected to the base and a second linkage in the pair of linkages is connected to the third member. The first linkage assembly is geared to the second linkage assembly.

In some embodiments, the attachment is operated in conjunction with the parallel jaw gripper to place or insert the object by: gripping the object between the first member and the second member, positioning the object at a desired position, rotating the robotic tool around a contact point between the distal end of the object and the surface, adjusting the first member and the second member of the robotic tool while rotating the robotic tool around a contact point between the object and one of the first member or the second member, and performing a push-tuck maneuver by extending a third member to eject the object from the robotic tool.

DETAILED DESCRIPTION

The present disclosure is directed to techniques for using robotic manipulation for precision insertion and placement of thin form-factor objects. The techniques disclosed herein incorporate novel dexterous manipulation operations that are implemented using conventional robotic grippers modified to include an additional component to apply a force to the object in the gripper to push the object out of the gripper while the gripper is being manipulated by the robot. The dexterous manipulation operations help eliminate inaccuracy in object positioning during assembly tasks. Throughout the entire assembly process, the object is secured within the gripper.

Figure 1A:
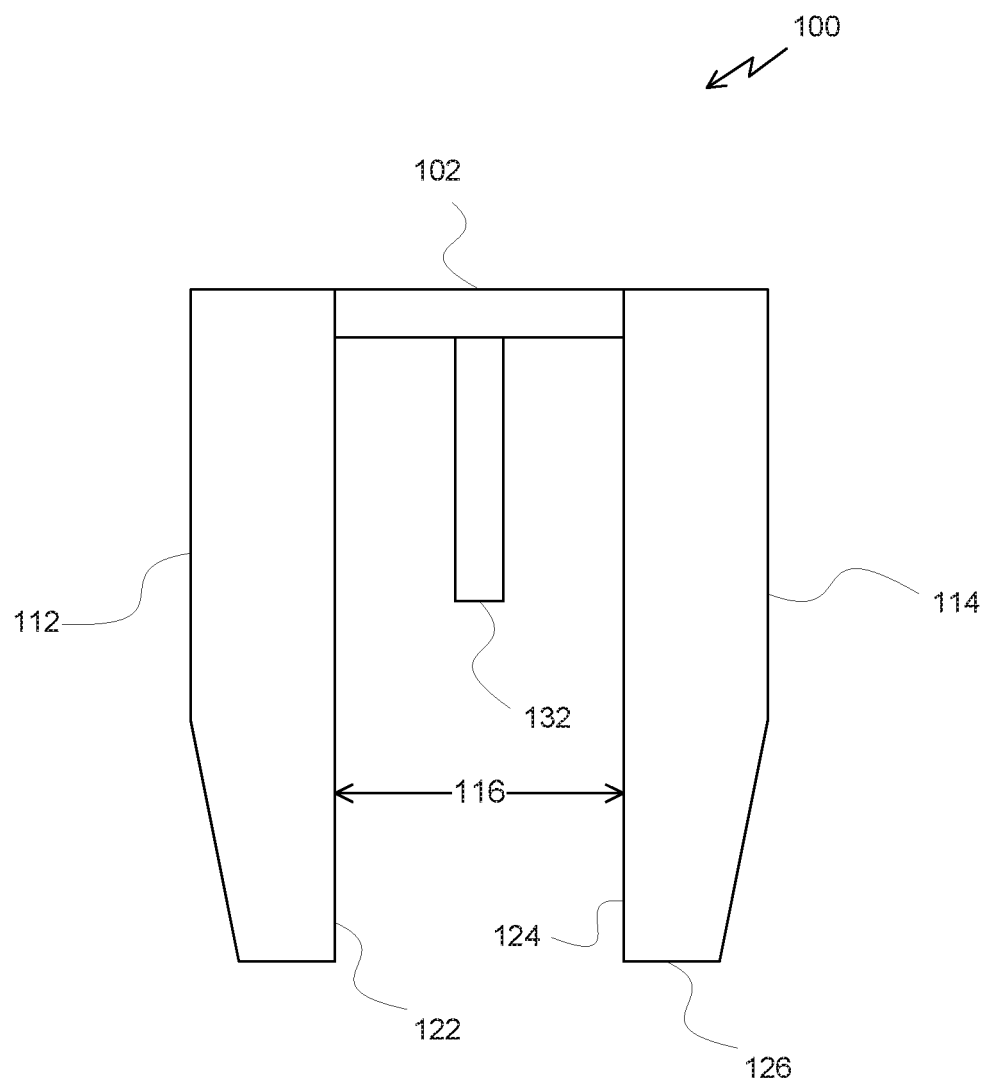
FIG. 1A illustrates a robotic tool used to insert and place a thin form-factor object, in accordance with some embodiments.

FIG. 1A illustrates a robotic tool 100 used to insert and place a thin form-factor object, in accordance with some embodiments. The robotic tool 100 can be referred to as a gripper, robotic hand, end-effector, or the like. As used herein, the term "thin form-factor" can refer to an object having a width that is less than half the length of the object. In some embodiments, the object width is less than a tenth of the object length. A common example of a thin form-factor object is a battery of a mobile phone.

In some embodiments, the robotic tool 100 includes a jaw mechanism including two members. The robotic tool 100 includes three or more structural members (e.g., fingers), where at least two members of the robotic tool grip the object by exerting force across the width dimension. A first member 112 and a second member 114 are arranged to open and close in order to adjust a gap 116 between a face 122 of the first member 112 and an opposing face 124 of the second member 114. The maximum size of the gap 116 is sufficient to hold an object of a given width. In an embodiment, the face 122 is parallel to the opposing face 124. In an embodiment, the first member 112 and the second member 114 operate similar to conventional parallel jaw grippers. The actuator to control the first member 112 and/or the second member 114 can be a lead screw, a motor and/or gear set, a pneumatic or hydraulic cylinder, or the like. In another embodiment, the first member 112 and the second member 114 operate similar to a scissor-mechanism end-effector, where the first member 112 and the second member 114 are fixed at a pivot point attached to the base 102 (common pivot point or separate pivot points) and rotate around the pivot point to close or open.

The robotic tool 100 also includes a third member 132 disposed between the first member 112 and the second member 114. The third member 132 is operable to apply a force to a proximal end of an object gripped between the first member 112 and the second member 114 when the robotic tool 100 is in a closed position and gripping the object. The third member 132 can be configured to push the object beyond an end 126 of the robotic tool 100.

In an embodiment, the third member 132 extends and retracts through a hole in the base 102 (e.g., palm) of the robotic tool 100. In another embodiment, the third member 132 can include multiple links and one or more joints that can be operated to move linearly between the first member 112 and the second member 114. For example, the third member 132 could be similar to a scissor lift mechanism. In an embodiment, the third member 132 includes a Sarrus linkage. Alternatively, the third member 132 could be any number of linked structures designed to move an end of the last linked structure in a linear direction between the first member 112 and the second member 114. In an embodiment, the third member 132 can be added to a conventional parallel jaw gripper as long as the operation of the third member 132 does not interfere with the motion of the jaw mechanism (e.g., the first member 112 and the second member 114).

Although not shown explicitly in FIG. 1A, in some embodiments, the first member 112 can be longer than the second member 114. Alternatively, the second member 114 can be longer than the first member 112. In some cases, by adjusting the length of the first member 112 or second member 114 relative to the other, lead times of a manufacturing process can be reduced. In addition, in some cases, non-equal member lengths can play a critical role in securing the object.

The motion of the third member 132 can be along a primary axis of the robotic tool 100. The primary axis is defined as being located halfway between the face 122 and the opposing face 124 of the first member 112 and the second member 114, respectively. The primary axis can also be centered within a thickness of the first member 112 and second member 114, where the thickness is a dimension into the plane of the Figure.

Figure 1B:
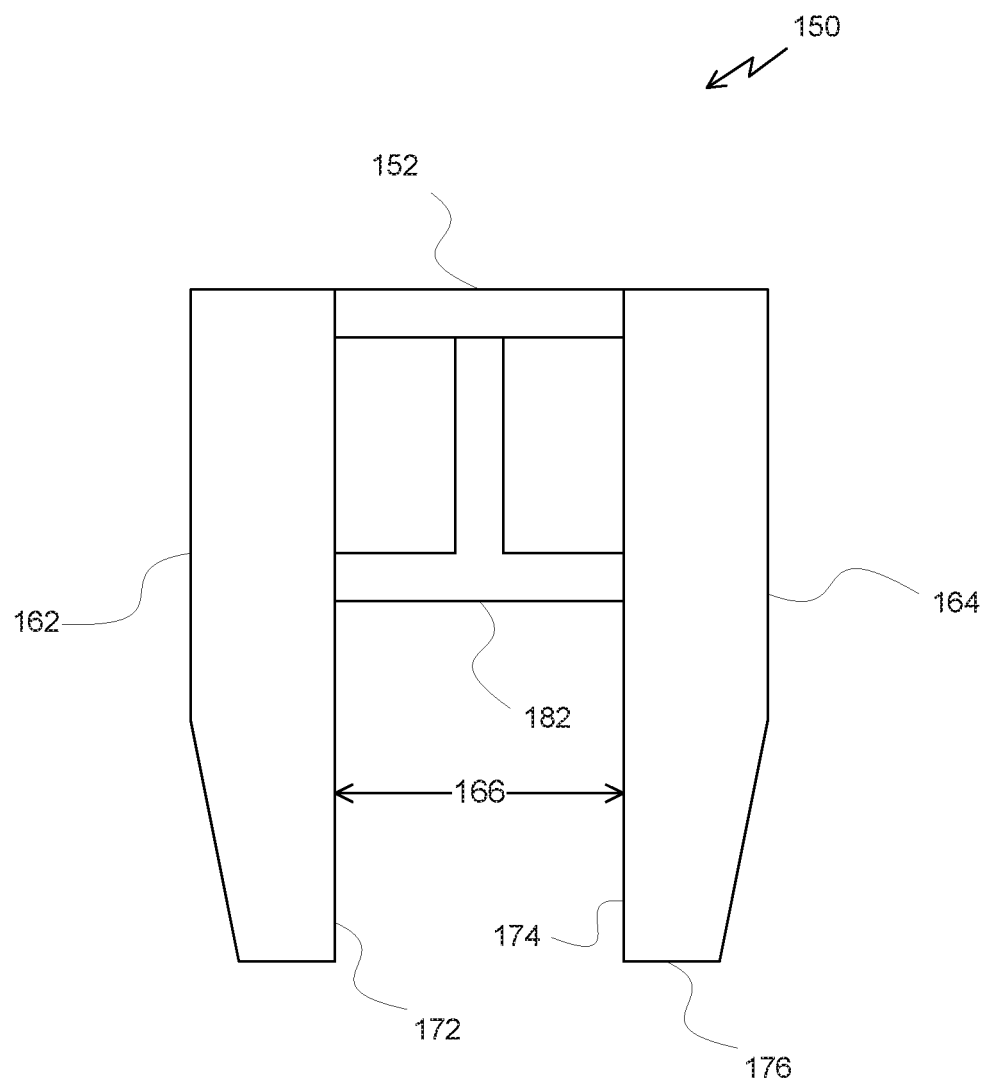
FIG. 1B illustrates a robotic tool used to insert and place a thin form-factor object, in accordance with other embodiments.

FIG. 1B illustrates a robotic tool 150 used to insert and place a thin form-factor object, in accordance with other embodiments. The robotic tool 150 is similar to robotic tool 100 and includes a base 152, a first member 162, and a second member 164 that are similar to base 102, the first member 112, and the second member 114, respectively, of robotic tool 100. The first member 162 and the second member 164 open and close to change a width of the gap 166 between a first face 172 of the first member 162 and an opposing face 174 of the second member 164.

In the robotic tool 100, the third member 132 is narrow and has a small tip that will contact an object in the robotic tool at approximately a point-contact. In contrast, the robotic tool 150 includes a third member 182 that has a wide cross section. Instead of contacting an object gripped between the first member 112 and the second member 114 at a point near the mid-point between the first face 122 and the opposing face 124, the third member 182 contacts the object across the entire width of the gap 166 (assuming the object has a flat surface that is parallel to the face of the third member 182). In an embodiment, the third member has a width that is equal to the maximum width of the gap 166 when the robotic tool 150 is in an open configuration. The ends of the third member 182 can extend into slots in the first member 162 and the second member 164. The slots allow the first member 162 and the second member 164 to close without interfering with the third member 182. Of course, in other embodiments, the robotic tool 100/150 can take other forms.

Figure 2A:
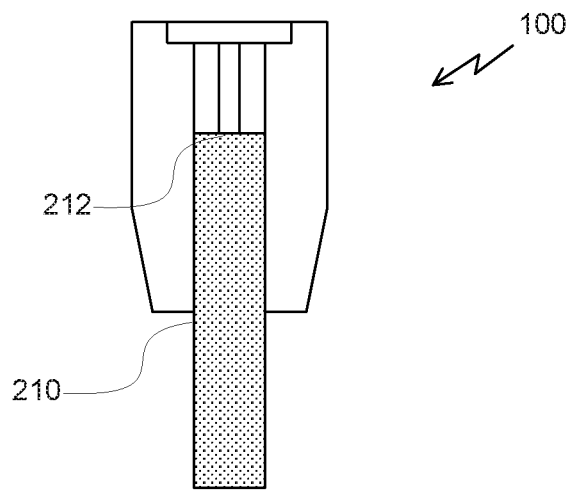
FIGS. 2A-2G illustrates a technique for precision insertion of an object into a shallow hole, in accordance with some embodiments.

FIGS. 2A-2G illustrates a technique for precision insertion of an object into a shallow hole, in accordance with some embodiments. As depicted in FIG. 2A, the robotic tool 100 grips an object 210 between the first member 112 and the second member 114. In an embodiment, the third member 132 is moved to put a force on the proximal end 212 of the object 210 to extend the object 210 a specified distance from the end 126 of the robotic tool 100.

Figure 2B:
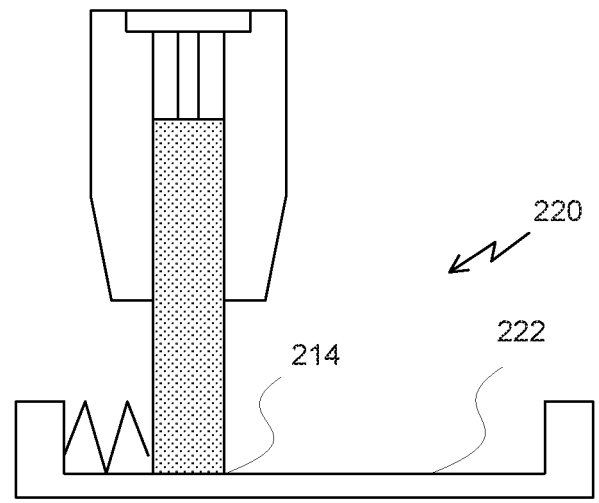

As depicted in FIG. 2B, the distal end 214 of the object 210 is positioned at a location in a shallow hole 220 such that the distal end 214 of the object 210 is in contact with a surface 222 of the shallow hole 220. In an embodiment, the shallow hole 220 includes a spring (depicted as a coil on the left side of the shallow hole 220), which may be common in some spring-loaded cylindrical battery holders. The spring forces the object 210 to one side of the shallow hole 220. In other embodiments, other retention mechanisms or structures can be included in the hole. In yet other embodiments, the hole may have tighter tolerances to the length of the object 210 and may not include any retention mechanisms or springs.

Figure 2C:
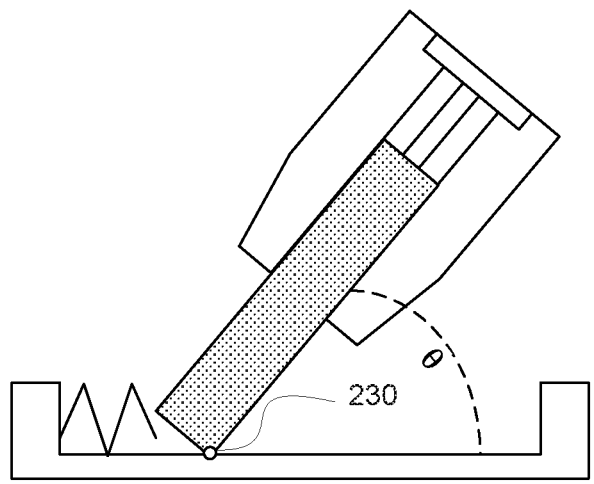

As depicted in FIG. 2C, the robotic tool 100 is rotated around a contact point 230 between the distal end 214 of the object 210 and the surface 222 of the shallow hole 220. The maneuver decreases the angle θ between the object 210 and the surface 222 of the shallow hole 220. During the maneuver, the object 210 does not lose contact with the surface 222, and the relative configuration between the object 210 and the members 112, 114, 132 remains constant. It will be appreciated that by rotating the object 210 around the contact point 230, the object 210 is completely secure during the maneuver. The maneuver depicted in FIG. 2C can be referred to as a form-closed tilt maneuver.

Figure 2D:
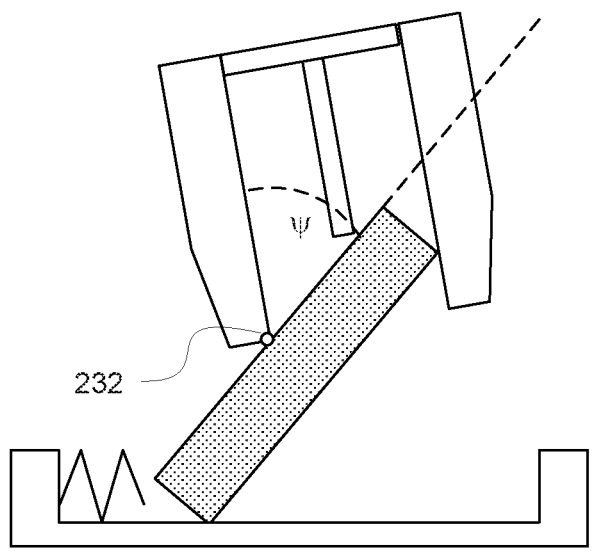

As depicted in FIG. 2D, the robotic tool 100 is adjusted in order to adjust the orientation of the object 210 relative to the robotic tool 100. At the beginning of the maneuver, the first member 112 and the second member 114 are completely closed against the object 210. During the maneuver, the first member 112 and the second member 114 are opened while at the same time the robotic tool 100 is rotated around a contact point 232 between the object 210 and either the first member 112 or the second member 114. The relative amount of rotation can be denoted as an angle $\psi$. It will be appreciated that the third member 132 may also be adjusted during the maneuver, and the proximal end 212 of the object may slide against the face of the opposite member 114 or 112, respectively, from the member 112, 114 that contacts the object 210 at the contact point 232. The maneuver shown in FIG. 2D can be referred to as a form-closed regrasp maneuver.

It will be appreciated that the form-closed regrasp maneuver requires some amount of robotic dexterity in order to (1) open the jaws while (2) maintaining contact between the member 112 or 114 and the proximal end 212 of the object 210 while simultaneously rotating the robotic tool 100 around the contact point 232. The additional member 132 is actively controlled to maintain the force on the proximal end 212 of the object 210 in order to keep the part secure between the surface 222 of the shallow hole 220 and the robotic tool 100. In an embodiment, a feedforward control system featuring position control is implemented to control the position and orientation of the robotic arm 100 as well as the configuration of the members 112, 114, 132. In another embodiment, a feedback control system featuring admittance/impedance control is implemented to control the position and orientation of the robotic arm 100 as well as the configuration of the members 112, 114, 132.

Figure 2E:
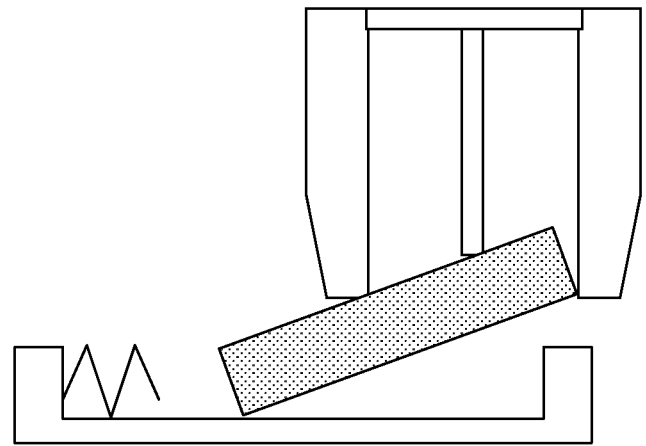

As depicted in FIG. 2E, the maneuvers of FIGS. 2C and 2D are iterated to bring the part closer to the target configuration where angle θ→0° and angle $\psi$→90°. These repeated iterations can be referred to as repeated tilt and regrasp maneuvers.

Figure 2F:
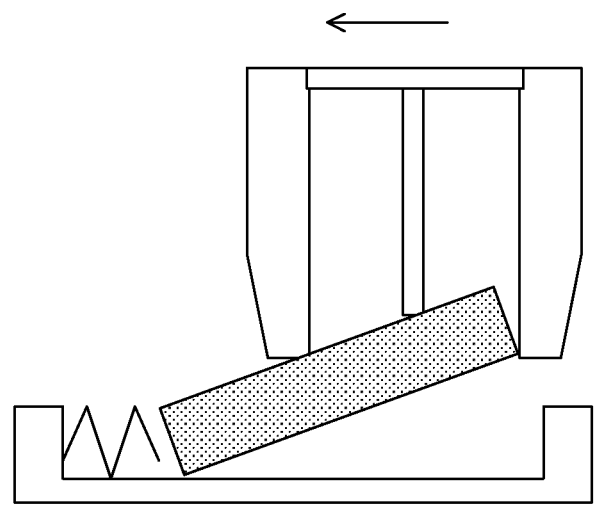

As depicted in FIG. 2F, the robotic tool 100 can be translated horizontally to precisely locate the object. During this maneuver, the object 210 is completely controlled between the members 112, 114, 132 of the robotic tool 100 and the surface 222. The maneuver shown in FIG. 2F can be referred to as a surface slide maneuver. In some embodiments, the surface slide maneuver can be performed after each form-closed tilt and form-closed regrasp maneuver in the repeated tilt and regrasp maneuvers. In other words, the horizontal position of the object 210 relative to the shallow hole 220 can be adjusted intermittently as the configuration ($\theta$, $\psi$) of the object 210 is iteratively adjusted.

Figure 2G:
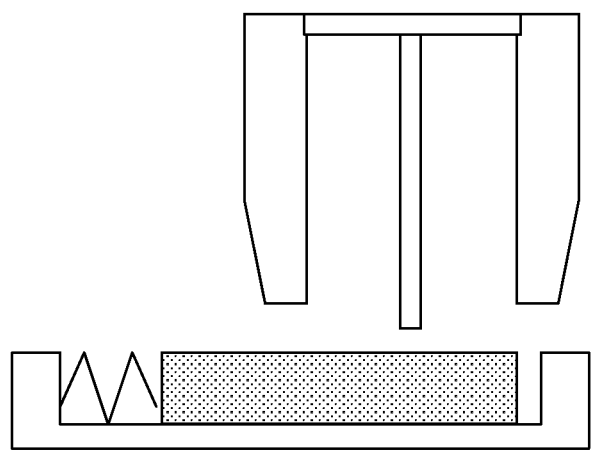

As depicted in FIG. 2G, the object 210 is tucked (e.g., engaged) into the final target position in the shallow hole using the third member 132. By extending the third member 132 past the end 126 of the robotic tool 100, the object 210 is no longer retained in the robotic tool 100 and is fully seated in the shallow hole 210. The maneuver shown in FIG. 2G can be referred to as a push-tuck maneuver. In an embodiment, the robotic tool 100 is not rotated or translated relative to the shallow hole 220 during this maneuver. In other embodiments, the robotic tool 100 may translate horizontally relative to the shallow hole 210 during the maneuver, or the robotic tool 100 may rotate relative to the surface 222.

It will be appreciated that the procedure for precision insertion of the object into a shallow hole controls the object 210 within the gripper at all times. Although the robotic tool 100 is disclosed as having three members with at least two parallel jaws for gripping the object 210 and a separate member used to push the object 210 out of the gripper, this technique can be utilized with other types of robotic tools including three or more members.

Figure 3:
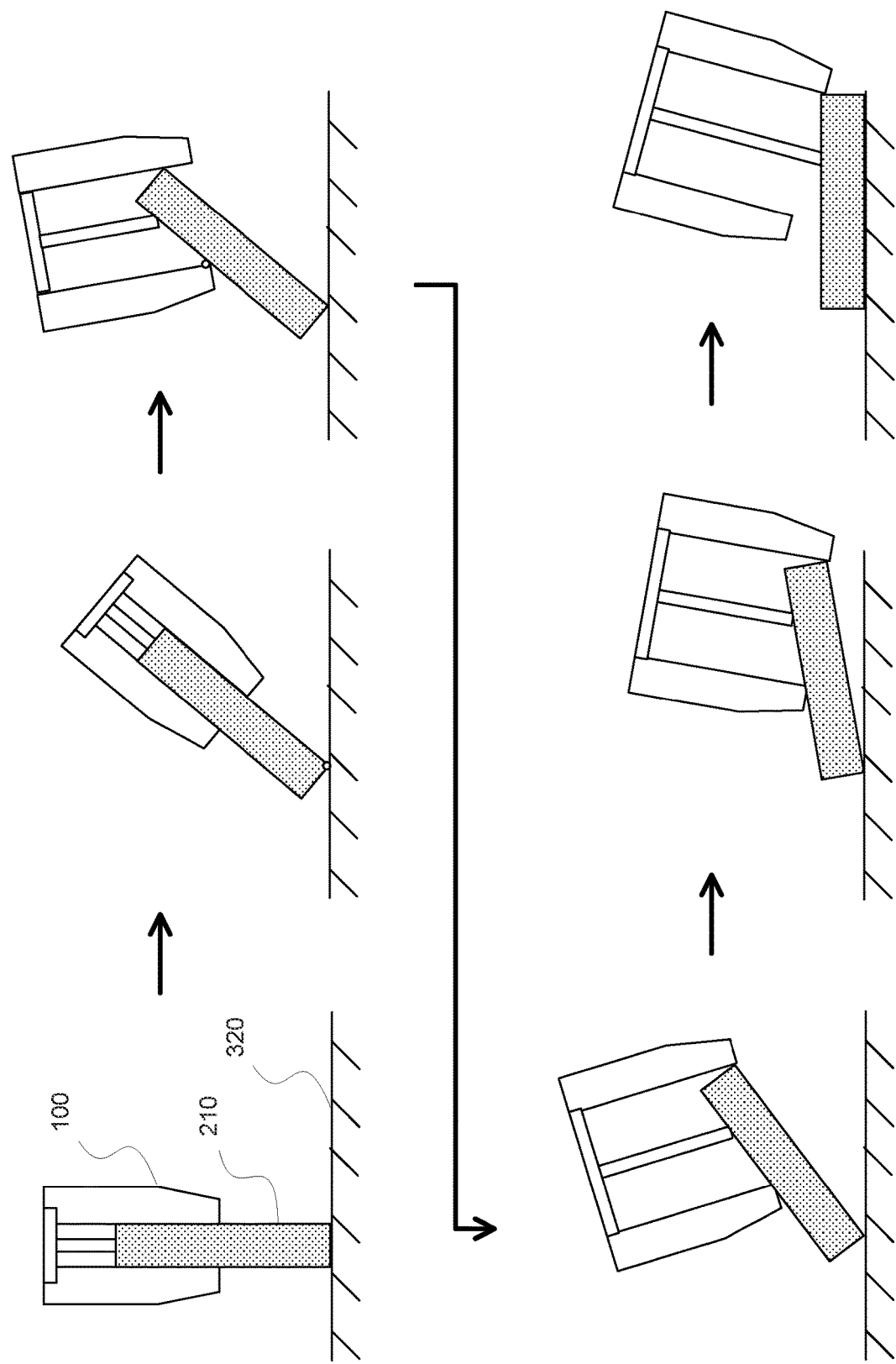
FIG. 3 illustrates a technique for precision placement of an object on a surface, in accordance with some embodiments.

FIG. 3 illustrates a technique for precision placement of an object 210 on a surface 320, in accordance with some embodiments. The technique illustrated in FIGS. 2A-2G can be applied to place an object 210 on a flat surface rather than a shallow hole. The technique is the same as that shown in FIGS. 2A-2G, except there are no vertical surfaces at the ends of the surface 222 that would restrict the object 210 relative to the surface 222.

As shown in FIG. 3, the technique for precision placement of the object 210 begins by moving the object 210 in the tool to a position where the distal end of the object 210 is contacting a point on the surface 320. A form-closed tilt maneuver is performed to reduce the angle $\theta$ between the object 210 and the surface 320. A form-closed regrasp maneuver is performed to change the relative angle $\psi$ between the object 210 and the robotic tool 100. Repeated tilt and regrasp maneuvers can be performed to bring the object closer to the target configuration. Finally, a push-tuck maneuver is performed to place the object 210 at the desired location and orientation.

Although not shown explicitly in FIG. 3, the precision placement technique can include a surface slide maneuver after one or more of the tilt and regrasp maneuver(s).

Figure 4A:
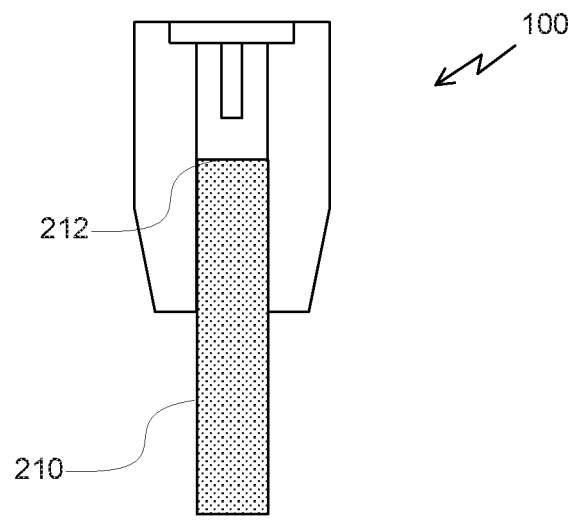
FIGS. 4A-4B illustrate an in-gripper reposition manipulation technique using the third member, in accordance with some embodiments.
Figure 4B:
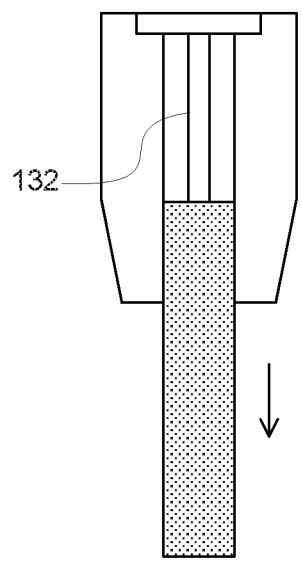

FIGS. 4A-4B illustrate an in-gripper reposition manipulation technique using the third member, in accordance with some embodiments. As depicted in FIG. 4A, the object 210 is initially gripped between the first member 112 and the second member 114 of the robotic tool 100. However, due to the relative positioning of the robotic tool 100 and the object 210, the final position of the object 210 may be different from a desired position of the object 210. In such cases, as depicted in FIG. 4B, the third member 132 can be moved to reposition the object 210. By extending the third member 132, the object 210 is extended and slides against the face 122 and the opposing face 124 of the first member 112 and the second member 114, respectively.

In some embodiments, the first member 112 and the second member 114 may be moved to reduce a friction force on the object 210 prior to the activation of the third member 132. It will be appreciated that the motion of the object 210 may be in a single direction (e.g., extending away from the robotic tool 100). However, reverse motion can be achieved by pushing the distal end of the object 210 against a surface, after retracting the third member 132, to push the object 210 towards the robotic tool 100. Once the object 210 is sufficiently inserted into the robotic tool 100, the third member 132 can again be extended to move the object 210 to the desired position.

Figure 5A:
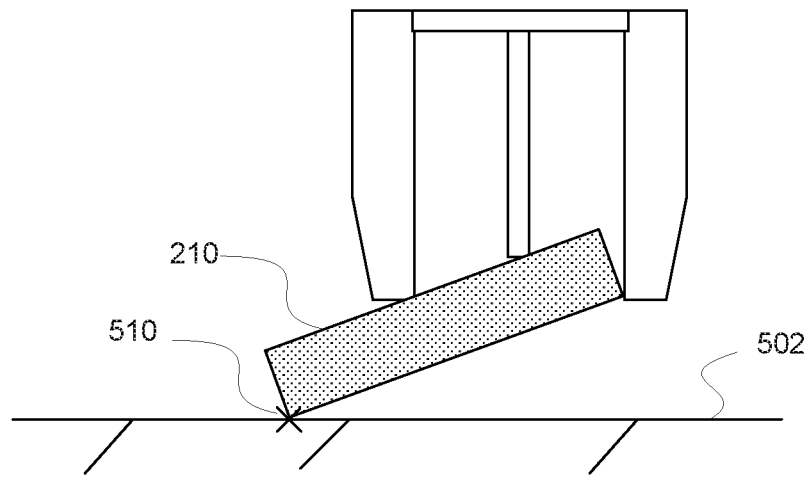
FIGS. 5A-5B illustrate the surface slide maneuver, in accordance with some embodiments.
Figure 5B:
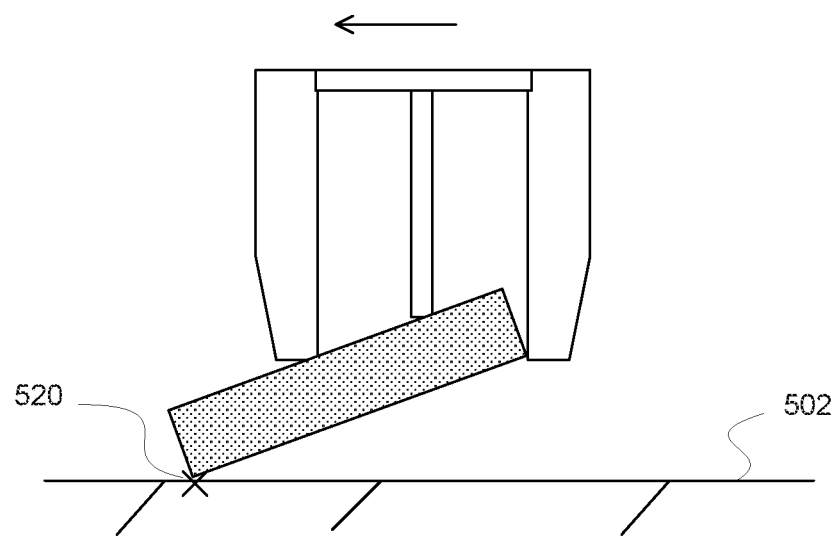

FIGS. 5A-5B illustrate the surface slide maneuver, in accordance with some embodiments. As depicted in FIG. 5A, the object 210 is located at a first position 510. The robotic tool 100 then translates right to left relative to a fixed surface 502. As depicted in FIG. 5B, the object 210 is moved to the second position 520, which is different from the first position 510.

It will be appreciated that the possible direction of translation in the surface slide maneuver may be determined by the configuration of the object 210 relative to the robotic tool 100. As shown in FIG. 5A, at the configuration of the object 210 with large $\psi$ and small $\theta$, translating from left to right could cause the object 210 to pivot around the contact point 510 such that the object 210 falls out of the robotic tool 100. In other configurations with small $\psi$ and large $\theta$, the object 210 is sufficiently enclosed between the first member 112 and the second member 114 that translations in any direction are possible without loss of control of the object 210.

Figure 6:
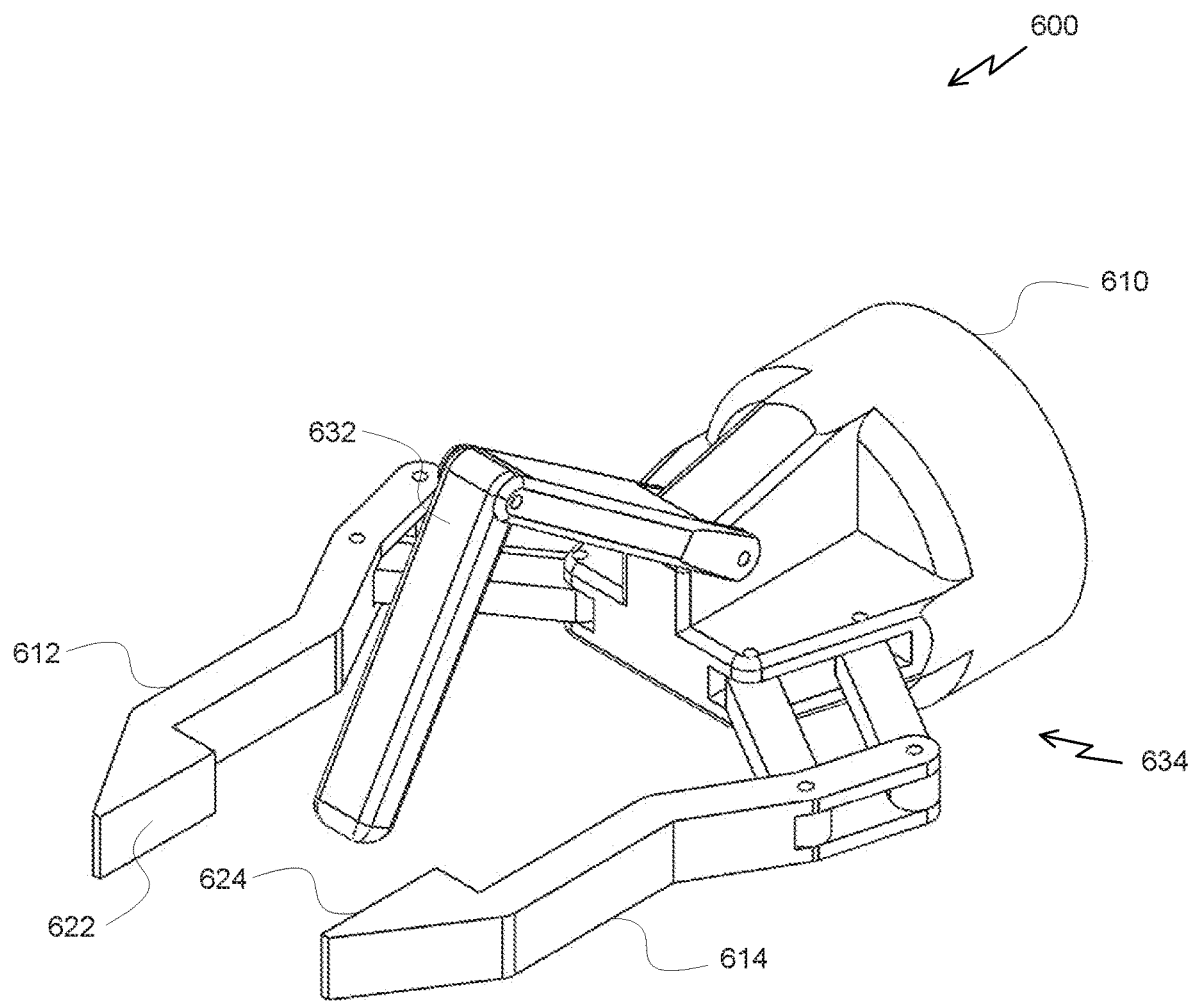
FIG. 6 illustrates a robotic tool, in accordance with some embodiments.

FIG. 6 illustrates a robotic tool 600, in accordance with some embodiments. The robotic tool 600 can be referred to as a stand-alone three-membered gripper. As depicted in FIG. 6, the robotic tool 600 includes opposing jaws (e.g., a first member 612 and a second member 614), with each jaw connected to a base 610 of the robotic tool with a 4-bar linkage 634. A face 622 of the first member 612 and an opposing face 624 of the second member 614 operate to grip the object.

A third member 632 is also connected to the base via a single link, connected to both the base 610 and the third member 632 via joints. The distal end of the third member 632 is disposed between the jaws of the gripper and moves in a linear direction parallel to the opposing faces of the jaws. The third member 632 is capable of exerting a force on the proximal end of the object when the object is gripped between the jaws.

It will be appreciated that the members of the robotic tool 600 are each actuated by one or more actuators (not explicitly shown in FIG. 6). The actuators can include motors, gears, pneumatic or hydraulic cylinders, or the like.

Figure 7A:
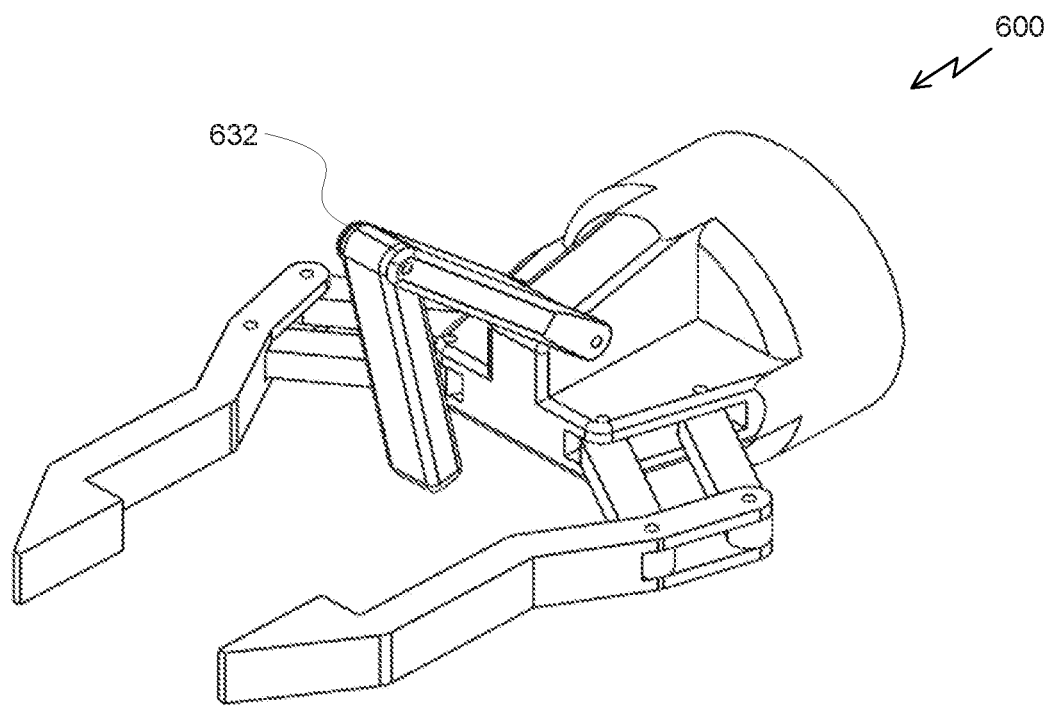
FIGS. 7A-7C illustrate the operation of the third member of the robotic tool, in accordance with some embodiments.
Figure 7B:
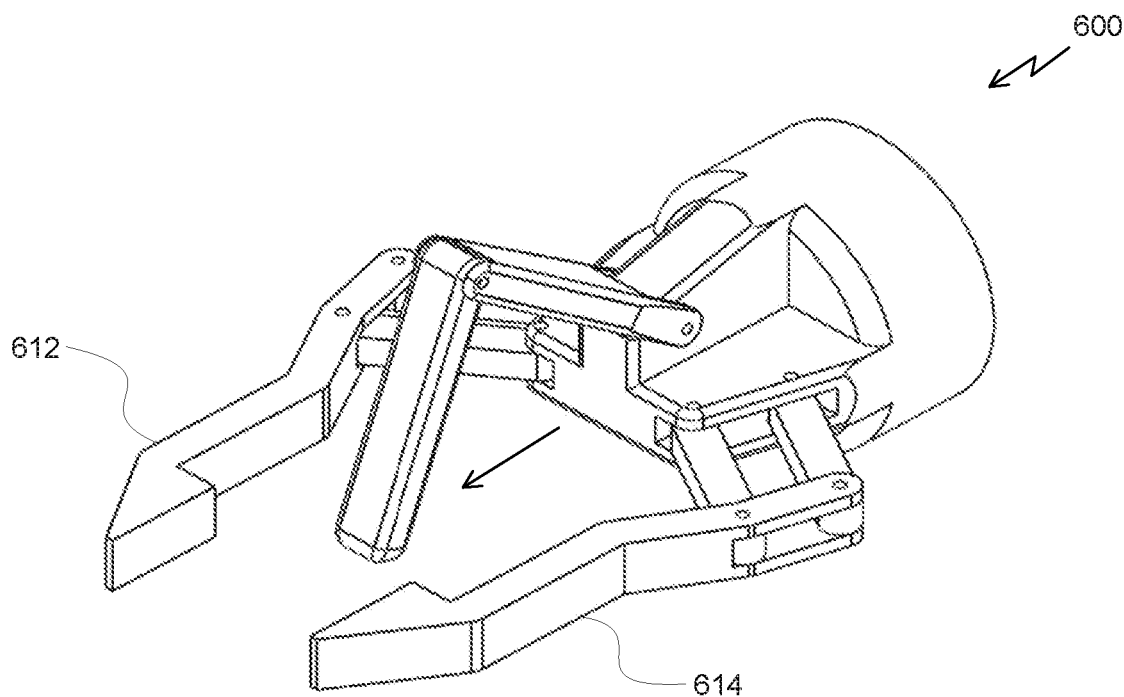
Figure 7C:
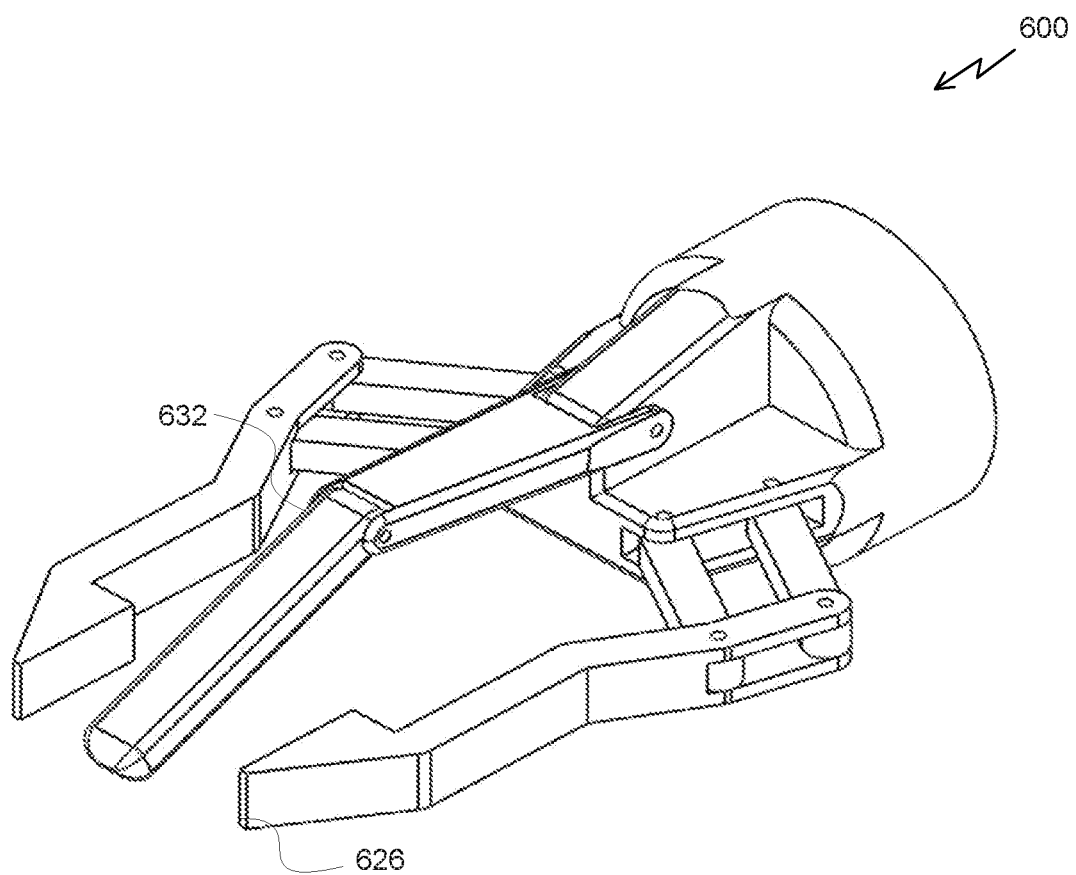

FIGS. 7A-7C illustrate the operation of the third member 632 of the robotic tool 600, in accordance with some embodiments. As depicted in FIG. 7A, the third member 632 is fully retracted. As depicted in FIG. 7B, the third member 632 is actuated to move linearly away from the base 610 in a direction between the first member 612 and the second member 614. As depicted in FIG. 7C, the third member 632 is fully extended and extends past an end 626 of the first member 612 and second member 614.

Figure 8:
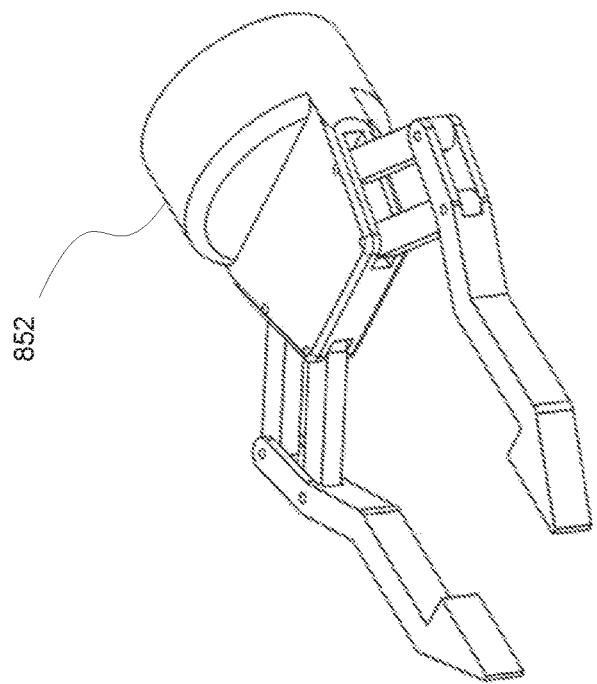
FIG. 8 is an attachment for a conventional parallel-jaw gripper, in accordance with some embodiments.
Figure 8:
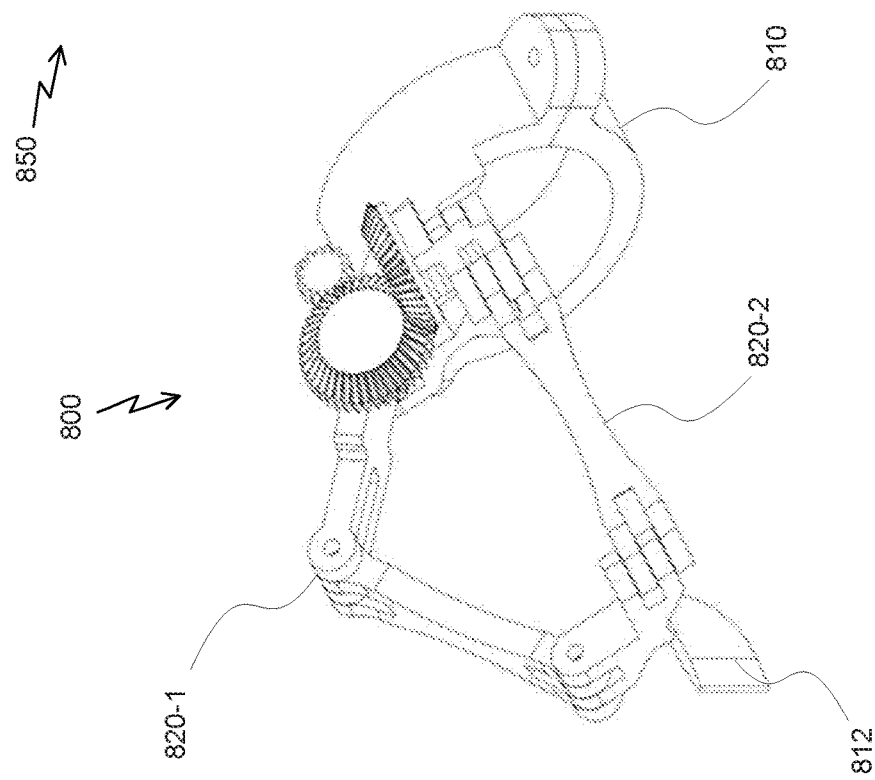

FIG. 8 is an attachment 800 for a conventional parallel-jaw gripper 850, in accordance with some embodiments. As depicted in FIG. 8, the attachment 800 includes an annular base 810 connected to a third member 812 via a pair of linkage assemblies 820, each linkage assembly 820 comprising two links connected at a central joint. The links proximate the annular base 810 are coupled to a conical gear that fixes the rotation of one link in a first linkage assembly 820-1 to a corresponding link in a second linkage assembly 820-2. One of the conical gears is connected to a drive gear attached to a motor (not explicitly shown). The gearing of the linkage assemblies 820 ensures matched motion by both linkage assemblies 820.

In an embodiment, the annular base 810 has an inner diameter that corresponds with an outer diameter of a base 852 of a conventional parallel jaw gripper 850 such that, when slid over the base of the gripper 850 and secured with bolts or other connectors through external flanges, the attachment 800 is secured to the gripper 850 and the third member 812 is disposed between the jaws of the gripper. In an embodiment, the inner surface of the annular base 810 is tapered to fit a conical surface of the base 852 of the gripper 850. The tapered fit ensures proper alignment of the attachment 800 along a primary axis of the gripper 850, where the primary axis is coaxial with the axis of the cylindrical base 852.

As depicted in FIG. 8, the third member 812 is relatively narrow and will not fill the gap between the jaws of the conventional parallel-jaw gripper 850. In other words, the third member 812 is designed to contact the object gripped between the jaws at a point contact or a small surface area proximate the midpoint between the jaws. This is similar to the operation of third member 132 of robotic tool 100, described above. In other embodiments, the third member 812 can be designed to span the gap between the jaws at a maximum open configuration and fit into slots formed in the jaws to allow the jaws to close without interfering with the third member 812, similar to third member 182 of robotic tool 150.

Figure 9A:
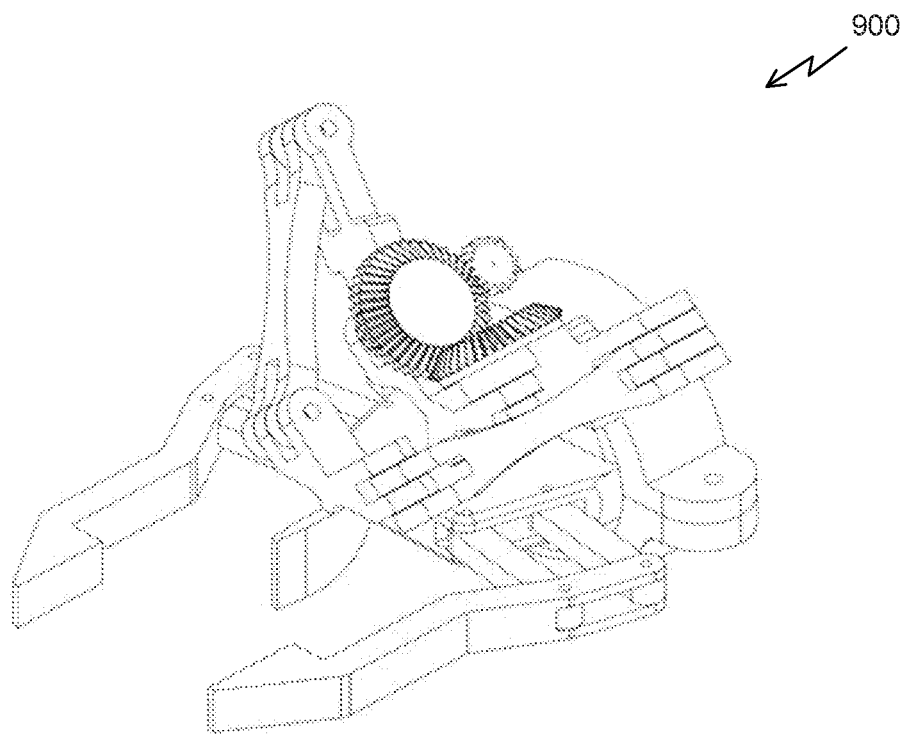
FIGS. 9A-9C illustrate the operation of the combination of the attachment and the gripper, in accordance with some embodiments.
Figure 9B:
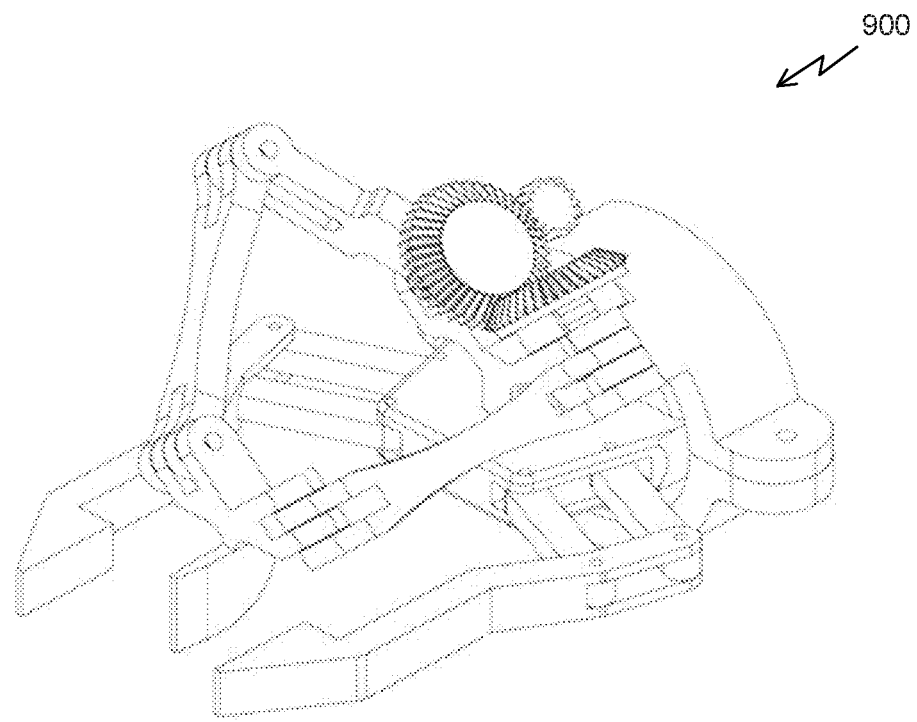
Figure 9C:
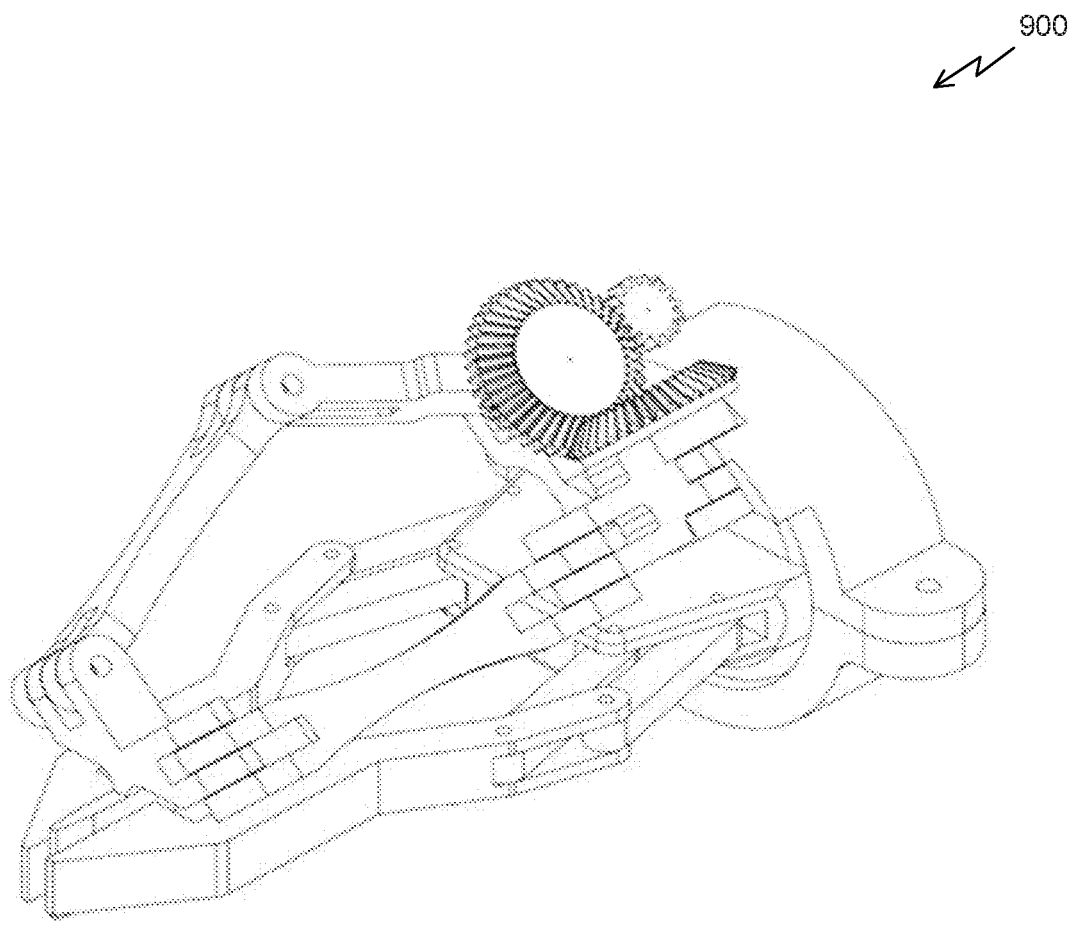

FIGS. 9A-9C illustrate the operation of the combination 900 of the attachment 800 and the gripper 850, in accordance with some embodiments. As depicted in FIG. 9A, the third member 812 is fully retracted. As depicted in FIG. 9B, the third member 812 is actuated to move linearly away from the annular base in a direction between the jaws of the gripper 850. As depicted in FIG. 9C, the third member 812 is fully extended. It will be appreciated that the third member 812 may not extend past the end of the jaws of the gripper 850. However, in other embodiments, the full extension of the third member 812 protrudes past the end of the jaws of the gripper 850.

Figure 10:
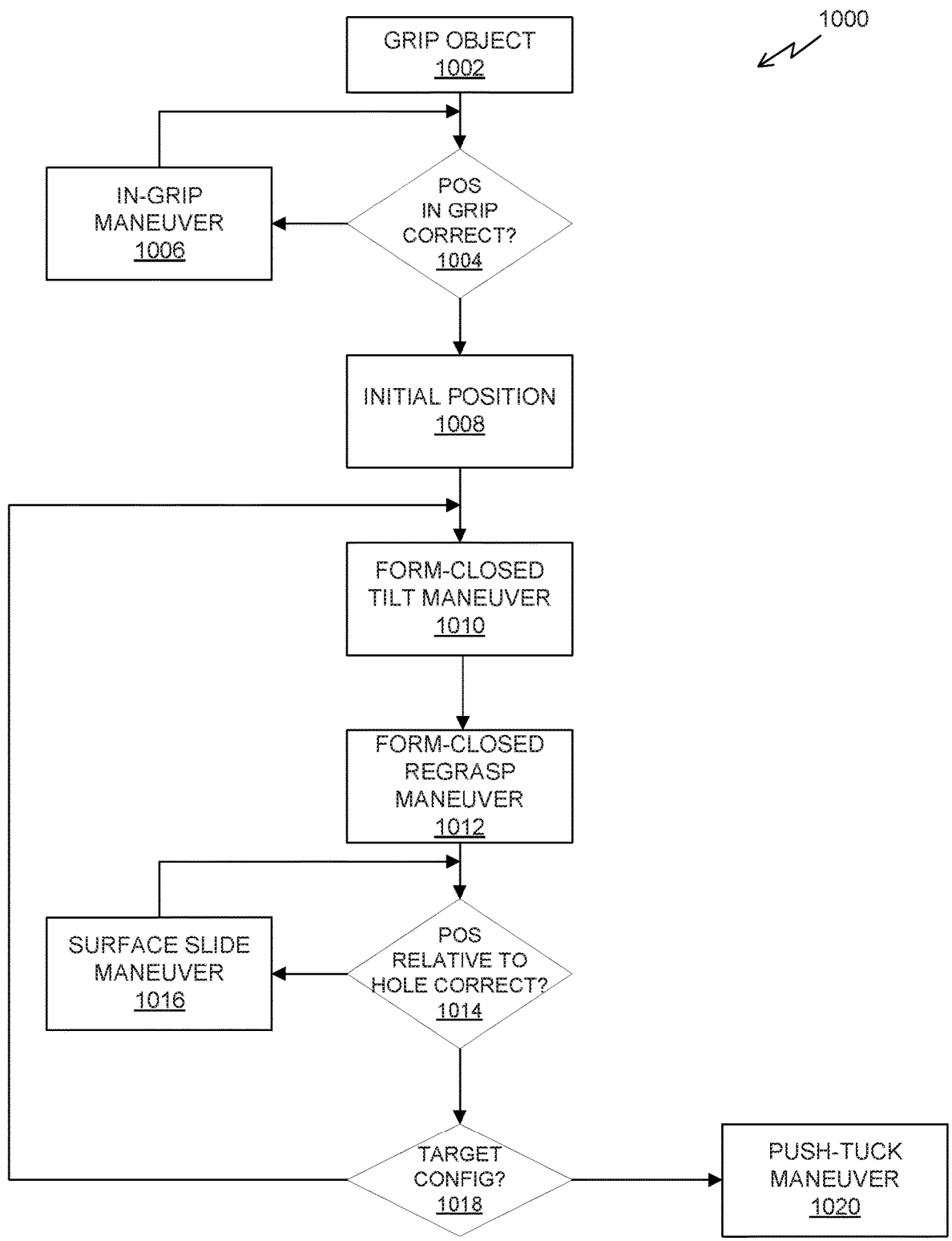
FIG. 10 is a flow diagram of a method for precision placement and insertion of a thin form-factor object, in accordance with some embodiments

FIG. 10 is a flow diagram of a method 1000 for precision placement and insertion of a thin form-factor object, in accordance with some embodiments. The method 1000 can be performed by a robotic system including the robotic tool 100, 150, 600, or combination 900 of the attachment 800 and gripper 850, as described above. It will be appreciated that the method may be performed, at least in part, by a control system designed to generate control signals for each of the actuators attached to the structural members of the robotic tools.

At step 1002, the robotic tool grips a thin form-factor object. In an embodiment, a control signal causes the robot to position the robotic tool proximate the object and close the jaws of the gripper mechanism. For example, motors that control the position of the jaws can be activated to move the first member towards the second member to close the gap between the members to match the width of the object.

At step 1004, the relative position of the object and the robotic tool is determined. In some embodiments, the robot may include a vision system or other feedback device (e.g., limit switches) to determine the position of the object in the gripper. If the object is not positioned correctly, then, at step 1006, an in-hand sliding maneuver is performed, and step 1004 is repeated. However, if the object is positioned correctly, then, at step 1008, an initial positioning maneuver is performed.

The initial positioning maneuver moves the object proximate the shallow hole (i.e., the target location) and arranges the object such that a distal end of the object is in contact with a surface of the shallow hole.

At step 1010, a form-closed tilt maneuver is performed. In an embodiment, the robotic tool is rotated around a contact point between the distal end of the object and the surface of the shallow hole. The form-closed tilt maneuver changes an angle between a face of the object and the surface of the shallow hole. At step 1012, a form-closed regrasp maneuver is performed. In an embodiment, the robotic tool opens the jaws while rotating around the contact point between the object and either the first member or the second member.

At step 1014, the relative position of the object and the shallow hole is determined. If the object is not positioned correctly, then, at step 1016, a surface sliding maneuver is performed, and step 1014 is repeated. However, if the object is positioned correctly, then, at step 1018, the configuration of the object is checked against a target configuration. The target configuration can be a penultimate position of the object prior to the final push-tuck maneuver. If the object is not at the target configuration, then steps 1010-1018 can be repeated one or more times to manipulate the object into the target configuration. It will be appreciated that the form-closed tilt maneuver and the form-closed regrasp maneuver may be limited to small corrections in order to maintain control of the object throughout the maneuvers. Therefore, an iterative process of corrections to the configuration may be performed until the object is close to the target configuration.

Returning to step 1018, if the object is configured correctly, then, at step 1020, a final push-tuck maneuver is performed to insert or place the object in the shallow hole or on the surface.

Figure 11:
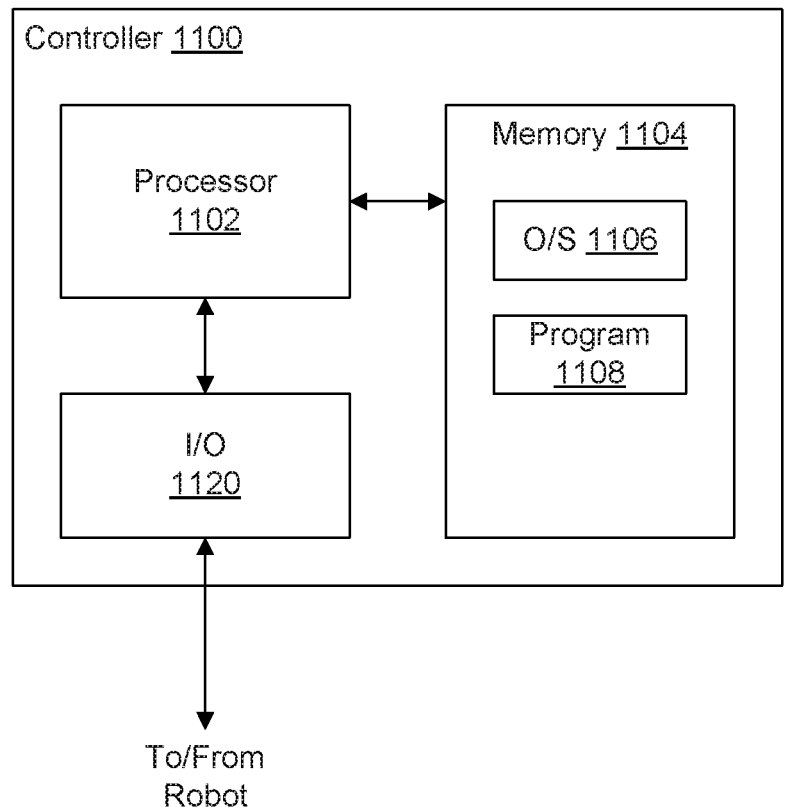
FIG. 11 illustrates an exemplary controller, in accordance with some embodiments.

FIG. 11 illustrates an exemplary controller 1100, in accordance with some embodiments. The controller 1100 includes a processor 1102, a volatile memory 1104, and an input/output (I/O) interface 1120. The processor 1102 can execute instructions that cause the controller 1100 to implement control algorithms to move the robot and/or actuate the robotic tool.

Each of the components 1102, 1104, and 1120 can be interconnected, for example, using a system bus to enable communications between the components. The processor 1102 is capable of processing instructions for execution within the system 1100. The processor 1102 can be a single-threaded processor, a multi-threaded processor, a vector processor or parallel processor that implements a single-instruction, multiple data (SIMD) architecture, or the like. The processor 1102 is capable of processing instructions stored in the volatile memory 1104. In some embodiments, the volatile memory 1104 is a dynamic random access memory (DRAM). The instructions can be loaded into the volatile memory 1104 from a non-volatile storage, such as a Hard Disk Drive (HDD) or a solid state drive (not explicitly shown), or received via the network. In an embodiment, the volatile memory 1104 can include instructions for an operating system 1106 as well as one or more programs 1108. It will be appreciated that the program(s) can be configured to control the robot. The I/O interface 1120 enables the controller 1100 to receive feedback signals from sensors attached to the robot and transmit control signals to the actuators of the robot.

It will be appreciated that the controller 1100 is merely one exemplary computer architecture and that the controller 1100 can include various modifications such as additional components in lieu of or in addition to the components shown in FIG. 11. For example, in some embodiments, the controller 1100 can be implemented as a system-on-chip (SoC) that includes a primary integrated circuit die containing one or more CPU cores, one or more GPU cores, a memory management unit, analog domain logic and the like coupled to a volatile memory such as one or more SDRAM integrated circuit dies stacked on top of the primary integrated circuit dies and connected via wire bonds, micro ball arrays, and the like in a single package (e.g., chip). In another embodiment, the controller 1100 can be implemented as programmable logic controller (PLC) with discrete interface cards connected to motor drivers or sensors.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the embodiments as claimed.

What is claimed is:

1. A controller configured to operate a robotic tool for precision placement or insertion, the controller comprising:
    a memory storing instructions for operating the robotic tool; and
    a processor configured to execute the instructions to cause the robotic tool to perform a series of maneuvers comprising:
    gripping an object between a first member and a second member of the robotic tool;
    positioning the object at a desired position, wherein, in the desired position, a distal end of the object contacts a surface;
    rotating the robotic tool around a first contact point between the distal end of the object and the surface;
    adjusting the first member and the second member of the robotic tool while rotating the robotic tool around a second contact point between the object and one of the first member or the second member; and
    performing a push-tuck maneuver by extending a third member to eject the object from the robotic tool, wherein the push-tuck maneuver includes at least one of translation or rotation of the robotic tool relative to the surface while extending the third member.

2. The controller of claim 1, the series of maneuvers further comprising, after the adjusting while rotating, repositioning the object horizontally along the surface.

3. The controller of claim 2, repeating, one or more times, the rotating, adjusting while rotating, and repositioning to bring the configuration of the object closer to a penultimate target configuration prior to performing the push-tuck maneuver.

4. The controller of claim 1, wherein the third member extends out of a hole in a base of the robotic tool.

5. The controller of claim 1, wherein the third member is attached to a base of the robotic tool via one or more links connected to the third member and the base via joints.

6. The controller of claim 1, wherein the first member and the second member are each connected to a base of the robotic tool via a 4-bar linkage assembly.

7. The controller of claim 6, wherein the third member is included in an attachment for a parallel-jaw gripper, and wherein the combination of the attachment with the parallel-jaw gripper comprises the robotic tool.

8. The controller of claim 1, wherein the processor receives feedback from an input/output (I/O) interface connected to one or more sensors, and wherein the feedback is utilized to position the object.

9. The controller of claim 1, wherein the object is a thin form-factor object.

10. The controller of claim 1, the series of maneuvers further comprising repositioning the object relative to the first member and the second member, utilizing the third member, prior to positioning the object at the desired position.

11. A method for precision placement or insertion of an object by a robotic tool, the method comprising:
gripping the object in a robotic tool, wherein the robotic tool includes a first member that exerts a force against a first face of the object and a second member that exerts an opposite force against an opposing face of the object, wherein a distance between the first face and the opposing face defines a width of the object;
positioning the object at a desired position, wherein, in the desired position, a distal end of the object contacts a surface;
rotating the robotic tool around a contact point between the distal end of the object and the surface;
adjusting the first member and the second member of the robotic tool while rotating the robotic tool around a contact point between the object and one of the first member or the second member; and
performing a push-tuck maneuver by extending a third member to eject the object from the robotic tool, wherein the push-tuck maneuver includes at least one of translation or rotation of the robotic tool relative to the surface while extending the third member.

12. The method of claim 11, further comprising, after the adjusting the first member and the second member of the robotic tool while rotating, repositioning the object horizontally along the surface, wherein the rotating, adjusting, and repositioning are performed repeatedly two or more times until the object is close to a penultimate target configuration.

13. The method of claim 11, wherein the object is secured between at least three contact points during all maneuvers of the robotic tool, the at least three contact points including a first contact point between the object and the surface, a second contact point between the object and the distal end of the third member, and a third contact point between the object and at least one of the first member or second member.

14. The method of claim 11, the method further comprising, after the adjusting while rotating, repositioning the object horizontally along the surface.

15. The method of claim 11, wherein the third member is attached to a base of the robotic tool via one or more links connected to the third member and the base via joints.

16. The method of claim 11, wherein the third member is included in an attachment for a parallel-jaw gripper, and wherein the combination of the attachment with the parallel-jaw gripper comprises the robotic tool.

17. The method of claim 11, the method further comprising repositioning the object relative to the first member and the second member, utilizing the third member, prior to positioning the object at the desired position.

18. An attachment for a parallel-jaw gripper that includes a first member and a second member configured to grip an object between a first face of the first member and an opposing face of the second member, the attachment comprising:
a base; and
a third member connected to the base via one or more linkage assemblies, wherein the linkage assemblies are configured to cause the third member to be disposed between the first member and the second member of the parallel-jaw gripper and move in a direction along a primary axis of the parallel-jaw gripper to exert a force on a proximate end of the object,
wherein the one or more linkage assemblies includes:
a first linkage assembly that includes a pair of linkages connected via a joint, a first linkage in the pair of linkages is connected to the base and a second linkage in the pair of linkages is connected to the third member; and
a second linkage assembly that includes a second pair of linkages connected via a second joint, a first linkage in the second pair of linkages is connected to the base and a second linkage in the pair of linkages is connected to the third member,
wherein the first linkage assembly is geared to the second linkage assembly.

\* \* \* \* \*